Patented July 4, 1944

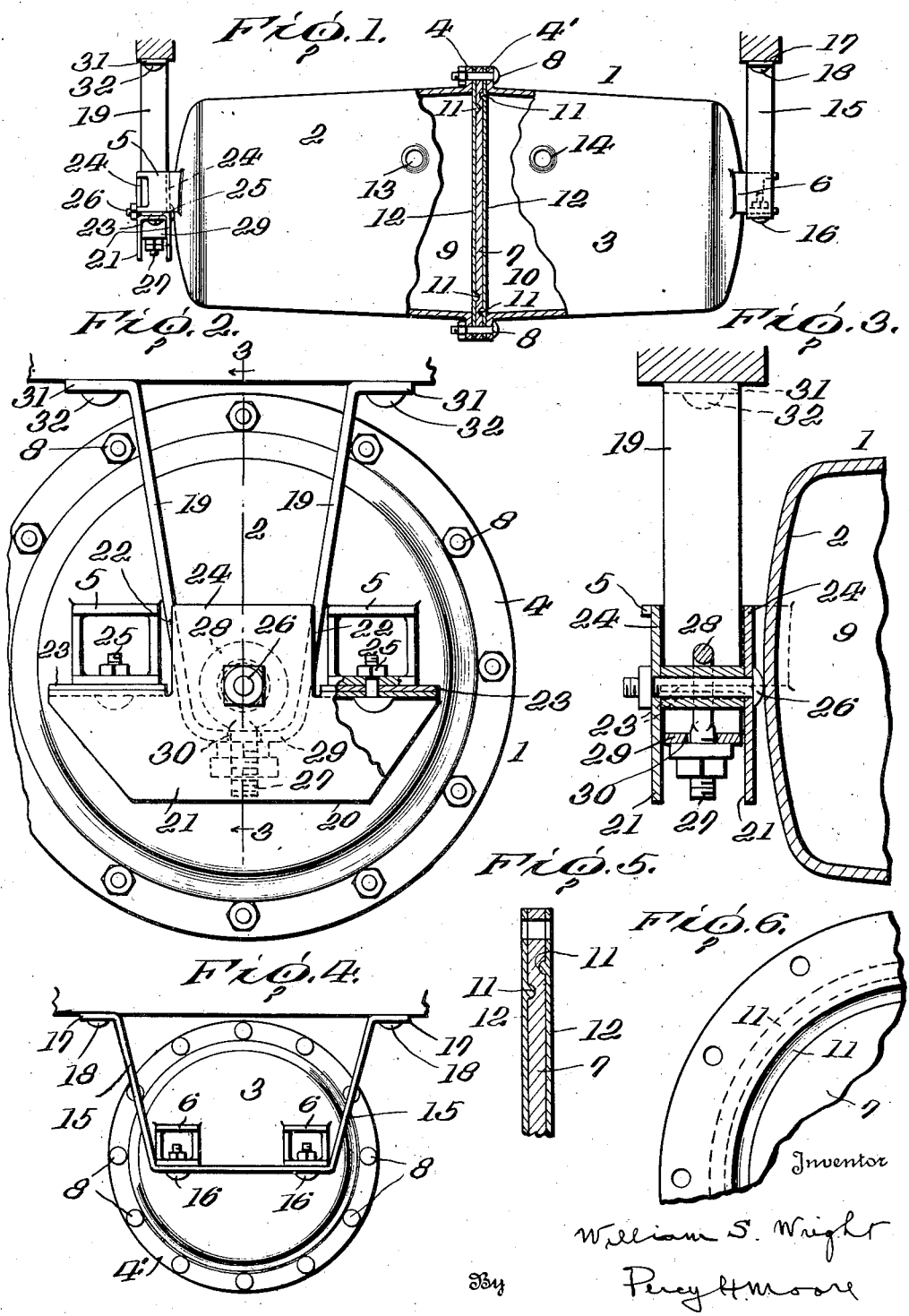

2,352,751

UNITED STATES PATENT OFFICE 2,352,751

FLUID RESERVOIR

William S. Wright, Newark, Ohio

Application February 3, 1943, Serial No. 474,573

7 Claims. (Cl. 303—1)

This invention relates to multi-chambered fluid reservoirs such as those used with modern quick release air brakes for freight service, and more particularly to the method of and means for suspending such reservoirs from the underframe of a car.

In modern quick release air brakes for freight service two reservoirs or chambers of unequal capacity are required. This requirement has been met by employing a partition plate between the two sections or chambers, rubber gaskets being used for packing between the connecting flanges of the sections and adjacent edges of the partition plate.

Reservoirs similar to the above are now in use having two supporting lugs at one end and only one such lug at the other end, these lugs resting upon and being supported by straps or hangers attached to the underframe of the car. However, due to the great torsional strains to which railway cars are subjected this one lug has not proven sufficiently strong for its service. Furthermore the rubber gaskets deteriorate in a relatively short space of time and render the joints liable to leakage.

One of the objects of the present invention is to overcome the foregoing objections by suspending such reservoirs from the underframe of a car in such a manner that they will not be adversely affected by the torsional strains of the car, thereby preventing breakage of the holding lugs or the disruption of the joints between the reservoir sections and the partition plate therebetween.

A further object of my invention is to provide a novel and efficient type of partition plate and gasket structure between the flanged reservoir sections or members.

A still further object of the invention is to provide a fluid reservoir which is adapted to fit in and be supported by the hangers now in use on railway cars.

In the accompanying drawing:

Figure 1 is a side view of a reservoir embodying the invention partly broken away and partly in section;

Figure 2 is an end view of the reservoir shown in Fig. 1;

Figure 3 is a section taken on the line 3—3 of Fig. 2;

Figure 4 is an end view of the reservoir showing the opposite end thereof to that shown in Fig. 2;

Figure 5 is an enlarged fragmentary sectional view of the separator plate; and

Figure 6 is a fragmentary side view of the separator plate showing the concentric cement grooves.

Referring to the drawing 1 denotes a multi-chambered reservoir made of two cup-shaped cast iron sections 2 and 3 of unequal volume having flanges 4 and 4', extending from their respective open ends and a pair of spaced supporting lugs 5 and 6 projecting from their respective closed ends. A partition plate 7, preferably of cast iron, is clamped between the faces of the flanges 4 and 4', any suitable means, such as bolts 8, being employed to clamp the opposed flanges and plate tightly together and thus provide two separate air tight compartments 9 and 10.

The edge or periphery of the partition plate 7, according to the shape of the sections 2 and 3, is coextensive with the edges or peripheries of the flanges 4 and 4', for a purpose presently described.

Opposite faces of the plate 7 are formed with annular concentric grooves 11 to receive any suitable cementitious material such as plastic iron cement, well known to workers in the foundry art. In drying, the iron cement slightly expands and produces a permanent air tight joint of iron-like texture. Before assembly of the sections 2 and 3, the cement is spread in the form of a sheet or layer 12, on the faces of the flanges 4 and 4' and on the adjoining faces of the partition plate and of course the plastic flows into and fills the annular grooves 11. As the sheet or layer 12 adheres more readily to the face of a rough iron casting than it does to a smooth face of the same material, the relatively costly operation of machining the faces of the adjoining members of the sections or of the intervening separator plate may be omitted. It should also be noted that the sheet or layer 12 of plastic cement readily compensates for any unevenness in the castings when the latter are clamped tightly together by the bolts 8. That portion of the cement seated in the grooves 11 serves to strengthen the bond between the partition plate and the cement layer and thus enhances the leak proof properties of the latter. The joint in a device of this kind must be not only leak proof but it must be also proof against vibration to withstand the severe vibrations which are set up in the frame of a car when in rapid movement. These features cannot be obtained by the use of a rubber gasket or one of other fibrous material because of their resiliency. A permanent satisfactory joint, under these conditions can be obtained only by the use of a gasket material which becomes hard to resist vibration.

Threaded openings 13 and 14 formed in the sides of the sections 2 and 3, for the reception of pipe (not shown), provide means for placing the reservoir compartments 9 and 10 in communication with the operating valve or other part of the brake assembly, also not shown.

The reservoir 1 is supported at one end by a substantially U-shaped strap or hanger 15, suitably secured intermediate its ends to the lugs 6, by any suitable means, such as bolts 16, the free ends of the strap having outwardly extending apertured extremities 17 adapted to be secured to the underframe of a car, by means of bolts 18, or other suitable fasteners. Due to the rigid conection of the hanger 15 with the car frame and the lugs 6 it is necessary to compensate for the torsional strains of the car, that is, prevent such torsional strains from adversely affecting the lugs or joints.

To accomplish this desideratum I provide a swivelled form of connection or support for the opposite end of the reservoir. Thus a hanger 19, also of substantially U-shape is employed, but instead of rigidly connecting this hanger directly to the lugs 5, it is indirectly connected thereto through the medium of a carrying member 20. This member comprises two plates 21, each slit or cut part way of its width adjacent its ends as at 22, to provide end and intermediate portions 23 and 24 respectively. The end portions 23 are then bent at right angles to the face of the plate to form seats for the lugs 5, when the two plates are assembled with the seat portion 23 of one plate in superposed relation to the seat portion 23 of its companion plate, as best illustrated in Figures 2 and 3.

The end seat portions 23 of the plates 21 are secured together and to the lugs 5 by means of bolts or other suitable fastenings 25, the respective parts being provided with registering bolt openings for this purpose. A bolt 26 extending transversely through the intermediate upstanding portions 24 of the plates 21, serves the double purpose of connecting these parts together and providing a bearing for an eye bolt 27, through the eye 28 of which the transverse bolt 26 loosely extends. The bolt 26 also passes transversely through the hanger 19, above and adjacent the closed lower end 29 thereof, and the eye bolt 27 extends through a bolt aperture 30 in the hanger thus connecting the various parts together and providing for free swivelling movement between the hanger 19 and carrying member 20.

As the member 20 supports one end of the multi-compartment reservoir 1, and is in turn suspended from the under surface of the car by means of the hanger 19, it follows that torsional strains will be compensated for by reason of the pivotal or swivelled connection between the hanger 19 and member 20. The upper extremities of the hanger 19 are formed with apertured offset portions 31 which are adapted to be secured to the under body of a car by means of bolts 32 or similar fastenings. Furthermore, it will be understood that by providing the reservoir with two lugs 5, seating upon and supported by the ends of the member 20, the liability of lug damage or breakage is correspondingly decreased.

The hangers, for this type of reservoir, as now used by the railways, have become somewhat standardized, having two holes in one hanger for fastening of the supporting lugs and only one hole in the other hanger for the same purpose. My reservoir is designed for and will fit in the existing hangers on all cars without requiring any additional holes therein. Also it may be installed in either endwise position by merely changing the carrying member from end to end of the reservoir and without changing the hangers under the car, whereas with all other types of similar reservoirs such hangers must be removed and their position shifted to accomplish such purpose.

Having thus described my invention, what I claim is:

1. A multi-compartment fluid reservoir for air brake systems having a plurality of supporting lugs at each end thereof, a hanger adapted for connection to the lugs at one end of the reservoir for supporting that end thereof, a second hanger for supporting the other end of the reservoir, a carrying member having means at each end thereof and each means being adapted to provide a seat for one of the lugs at said other end of the reservoir, and non rigid means connecting said second hanger to the intermediate portion of said carrying member, whereby a single point suspension is provided for said other end of said reservoir.

2. A reservoir assembly for air brake systems comprising a pair of spaced hangers, a reservoir, two spaced lugs formed on each end of said reservoir, one of said hangers connected directly to the lugs on one end of the reservoir, an independent carrying member having spaced means for engaging the two lugs on the other end of the reservoir, and means positioned on the other of said hangers and on said carrying member for swivelling said carrying member to said last mentioned hanger for movement about an axis positioned approximately midway said last two mentioned lugs.

3. In an assembly for air brakes, a multi chambered reservoir, a multiplicity of spaced lugs projecting from each end of said reservoir, a pair of spaced hangers, one of said hangers engaging the lugs on one end of the reservoir for supporting that end, an independent carrying member, and spaced means on said independent carrying member engaging the lugs on the other end of the reservoir for supporting said other end, and means for connecting said carrying member to the other of said hangers at a point midway said spaced means and midway said last mentioned lugs to pivotally suspend said other end of said reservoir at one point.

4. A reservoir assembly for air brake systems comprising a pair of spaced hangers, a reservoir, spaced lugs at one end of said reservoir and connected to one of said hangers, spaced lugs at the other end of said reservoir, an independent carrying member connected to said last mentioned spaced lugs, and means arranged between said last mentioned spaced lugs for connecting the independent member to the other of said hangers to suspend said other end of said reservoir at one point.

5. A reservoir assembly for air brake systems comprising a pair of spaced hangers, a reservoir, spaced lugs at one end of said reservoir and connected to one of said hangers, spaced lugs at the other end of said reservoir, an independent carrying member, means adjacent the ends of said member adapted to be connected to said last mentioned spaced lugs and means arranged between said ends of said member and between said last mentioned spaced lugs for connecting the said carrying member to the other of said hangers to suspend said other end of said reservoir at one point.

6. A reservoir assembly for air brake systems comprising a pair of spaced hangers, a reservoir, two spaced lugs formed on each end of said reservoir, one of the hangers connected directly to the lugs on one end of the reservoir, an independent carrying member having means engaging the two lugs on the other end of the reservoir, and means arranged between the last mentioned two lugs for connecting said intermediate carrying member to the other of said hangers to suspend said other end of said reservoir at one point.

7. A reservoir assembly for air brake systems comprising a pair of spaced hangers, a reservoir, two spaced lugs formed on each end of said reservoir, one of the hangers connected directly to the lugs on one end of the reservoir, an independent carrying member having means engaging the two lugs on the other end of the reservoir, and means arranged between the last mentioned two lugs for connecting said intermediate carrying member to the other of said hangers to pivotally suspend said other end of said reservoir at one point.

WILLIAM S. WRIGHT.